(12) United States Patent
Back et al.

(10) Patent No.: US 7,822,765 B2
(45) Date of Patent: Oct. 26, 2010

(54) COMPONENT-BASED CONTROL SYSTEM FOR COLLABORATIVE EXPLORATORY SEARCH SYSTEMS

(75) Inventors: Maribeth Joy Back, Woodside, CA (US); Jeremy Pickens, Milpitas, CA (US); Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 425 days.

(21) Appl. No.: 11/877,608

(22) Filed: Oct. 23, 2007

(65) Prior Publication Data
US 2009/0024585 A1 Jan. 22, 2009

Related U.S. Application Data

(63) Continuation-in-part of application No. 11/781,191, filed on Jul. 20, 2007.

(51) Int. Cl.
*G06F 17/30* (2006.01)
(52) U.S. Cl. .......................... 707/769; 707/706
(58) Field of Classification Search ................ 707/3–5, 707/706, 769, 737, 999.003
See application file for complete search history.

(56) References Cited

U.S. PATENT DOCUMENTS

| 7,440,976 | B2 * | 10/2008 | Hart et al. ................ 707/104.1 |
| 2007/0106627 | A1 * | 5/2007 | Srivastava et al. ............ 706/20 |
| 2007/0179945 | A1 * | 8/2007 | Marston et al. ................ 707/5 |
| 2007/0239678 | A1 * | 10/2007 | Olkin et al. .................... 707/3 |
| 2008/0282169 | A1 * | 11/2008 | Chang et al. ................ 715/733 |
| 2009/0006358 | A1 * | 1/2009 | Morris et al. .................. 707/5 |

OTHER PUBLICATIONS

Back, M., et al., Design Realization: Physical Instruments for Digital Systems, LOOP: AIGA Journal of Interaction Design Education Jun. 2003 No. 7.

Chi, E. H., et al., 2001. Using information scent to model user information needs and actions on the Web. In *Proceedings of the ACM Conference on Human Factors in Computing Systems*, Seattle, WA, Mar.-Apr., 490-497.

Wilkinson L., et al., High-dimensional Visual Analytics: Interactive Exploration Guided by Pairwise Views of Point Distribution, IEEE Transactions on Visualization and Computer Graphics, 2006.

(Continued)

*Primary Examiner*—Cheryl Lewis
(74) *Attorney, Agent, or Firm*—Sughrue Mion, PLLC

(57) ABSTRACT

Described is a component-based control system involving the interface and middleware layers for collaborative exploratory search. The components include modules for multi-user input and display capabilities, and are individually configurable to allow simultaneous manipulation of multiple search parameters and algorithms. In a collaborative exploratory search, a team of people with a shared information need engage in exploratory search together. This search happens synchronously, leveraging realtime feedback in the search loop. The search team works together, finding patterns and information that each player individually might not have found, and doing so more efficiently than any single person could have. Each team member brings their own expertise and point of view to a shared problem. Distributing tasks and roles among team members leverages individual expertise and creates efficiencies of scale. Supporting the different roles and tasks involves resolving complexities in control and display; a regulatory component performs this task.

20 Claims, 4 Drawing Sheets

OTHER PUBLICATIONS

Exploratory Search workshop report: http://hcil.cs.umd.edu/trs/2006-18/2006-18.htm.

Zamir, O. et al., Grouper: A Dynamic Clustering Interface to Web Search Results, pp. 283-296, In:_Proceedings of the Eighth International World Wide Web Conference, Elsevier, Toronto, Canada, May 1999, ISBN 0444502645.

Edwards Keith W., Policies and Roles in Collaborative Applications, pp. 11-20, In: Proceedings of the ACM 1996 Conference on Computer Supported Cooperative Work, ACM Press, Boston, Massachusetts, Nov. 1996, ISBN 0-89791-765-0.

Adcock, J., et al., Interactive Video Search Using Multilevel Indexing. In Proceedings of the International Conference on Image and Video Retrievel 2005, (2005), 205-214.

Hauptmann, A.G., et al., Extreme Video Retrievel: Joint Maximization of Human and Computer Performance. In Proceedings of the 14$^{th}$ annual ACM international conference on Multimedia, (Santa Barbara, CA., 2006), ACM, 385-394.

Morris, M.R., Interfaces for Collaborative Exploratory Web Search: Motivations and Directions for Multi-User Designs. In Proceedings of the CHI 2007 Workshop on Exploratory Search and HCI., (2007).

Morris, M.R., et al., TeamSearch: Comparing Techniques for Co-Present Collaborative Search of Digital Media. In Proceeding of the The First IEEE International Workshop on Horizontal Interactive Human-Computer Systems, (2006), 97-104.

Smeaton, A.F., et al., Fishclar-Diamondtouch: Collaborative Video Searching on a Table. In Proceedings of the SPIE Electronic Imaging-Multimedia Content Analysis, Management, and Retrieval, (2006).

Suroweicki, J., The Wisdom of Crowds. Random House, 2004.

* cited by examiner

COMPONENT-BASED CONTROL SYSTEM FOR COLLABORATIVE EXPLORATORY SEARCH SYSTEMS

This U.S. patent application is a continuation in part of U.S. patent application Ser. No. 11/781,191, filed on Jul. 20, 2007, and incorporated herein by reference in its entirety.

DESCRIPTION OF THE INVENTION

1. Field of the Invention

The present invention generally relates to search technology and, more specifically, to techniques for collaborative exploratory search.

2. Description of the Related Art

Most modern information retrieval (search) systems are geared toward helping a user quickly and effectively navigate to one particular item. That item may include things such as a document, a geographic location, or a factoid. This approach is good when a single piece of information can fulfill the user information need. However, in many situations multiple items and/or richer overviews of the entire information space are necessary. In support of this, exploratory search systems have been and continue to be developed. An exploratory search system is one that allows an intelligent mixture strategy of searching and browsing, often accompanied by tools such as query expansion term suggestion, document clustering, and document visualization in order to help the user better understand the range of available information.

Single-point search interfaces (e.g. web-based such as Google) are slow, unwieldy, involve significant wait times, and do not take advantage of human teamwork efficiently. Nor do they take advantage of human capabilities for multitasking and for multi-modal pattern recognition.

Currently, there is also much work around mass social search, or aggregation of large-scale user intention and information seeking behaviors. Web service sites such as del.icio.us and Digg let users bookmark and/or cast votes around their favorite pieces of information. This aggregate crowd behavior is used to steer the individual searcher toward the most relevant items. However, the problem with such systems is not only that there will be large numbers of documents in a system with no prior user attention at all, but the intentionality or information need of the crowd might not match the need of the current searcher.

Moreover, when doing exploratory searches, it is useful to have more than one person involved in finding all relevant information. However, current systems do not support active collaboration between searchers. Therefore, effort will be duplicated (wasted) and insights into potentially useful search avenues will not be obtained.

Thus, the existing technology is deficient in its ability to provide users with a framework that combines elements of both exploratory search and social search in one collaborative search system that actively coordinates and supports multiuser information seeking.

SUMMARY OF THE INVENTION

The inventive methodology is directed to methods and systems that substantially obviate one or more of the above and other problems associated with conventional techniques for collaborative exploratory search.

In accordance with one aspect of the inventive methodology, there is provided a computerized system for collaborative search. The inventive system includes a first user interface component operable to receive first search information from a first user. The first user is assigned a first role by the inventive system. The inventive system further includes a second user interface component configured to receive second search information from a second user. The second user is assigned a second role, which may be similar to or different from the first role. The inventive computerized system also includes an input regulator component operable to receive first search information from at least the first user interface and the second search information from the second user interface; and aggregate the received search information based at least on the first role and the second role. The inventive computerized system further includes a search engine interface operable to provide the aggregated search information search information to at least one search engine and to receive responsive search results; and an output regulator component operable to receive the search results from the search engine interface; route the search results based at least on the first role and the second role; and provide the routed search results to the first user interface and second user interface.

In accordance with another aspect of the inventive methodology, there is provided a computerized method for collaborative search. The inventive method involves receiving first search information from a first user, the first user being assigned a first role and receiving second search information from a second user, the second user being assigned a second role, the second role being similar to or different from the first role. The inventive method further includes aggregating the first search information and the second search information based at least on the first role and the second role; providing the aggregated search information to at least one search engine and receiving responsive search results from the search engine. In addition, the inventive method may involve routing the search results based at least on the first role and the second role and providing the routed search results to at least the first user and second user.

In accordance with yet another aspect of the inventive methodology, there is provided a computer readable medium embodying computer-readable instructions, which, when executed by one or more processors cause the one or more processors to perform a method for collaborative search. The inventive method involves receiving first search information from a first user, the first user being assigned a first role and receiving second search information from a second user, the second user being assigned a second role, the second role being similar to or different from the first role. The inventive method further includes aggregating the first search information and the second search information based at least on the first role and the second role; providing the aggregated search information to at least one search engine and receiving responsive search results from the search engine. In addition, the inventive method may involve routing the search results based at least on the first role and the second role and providing the routed search results to at least the first user and second user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
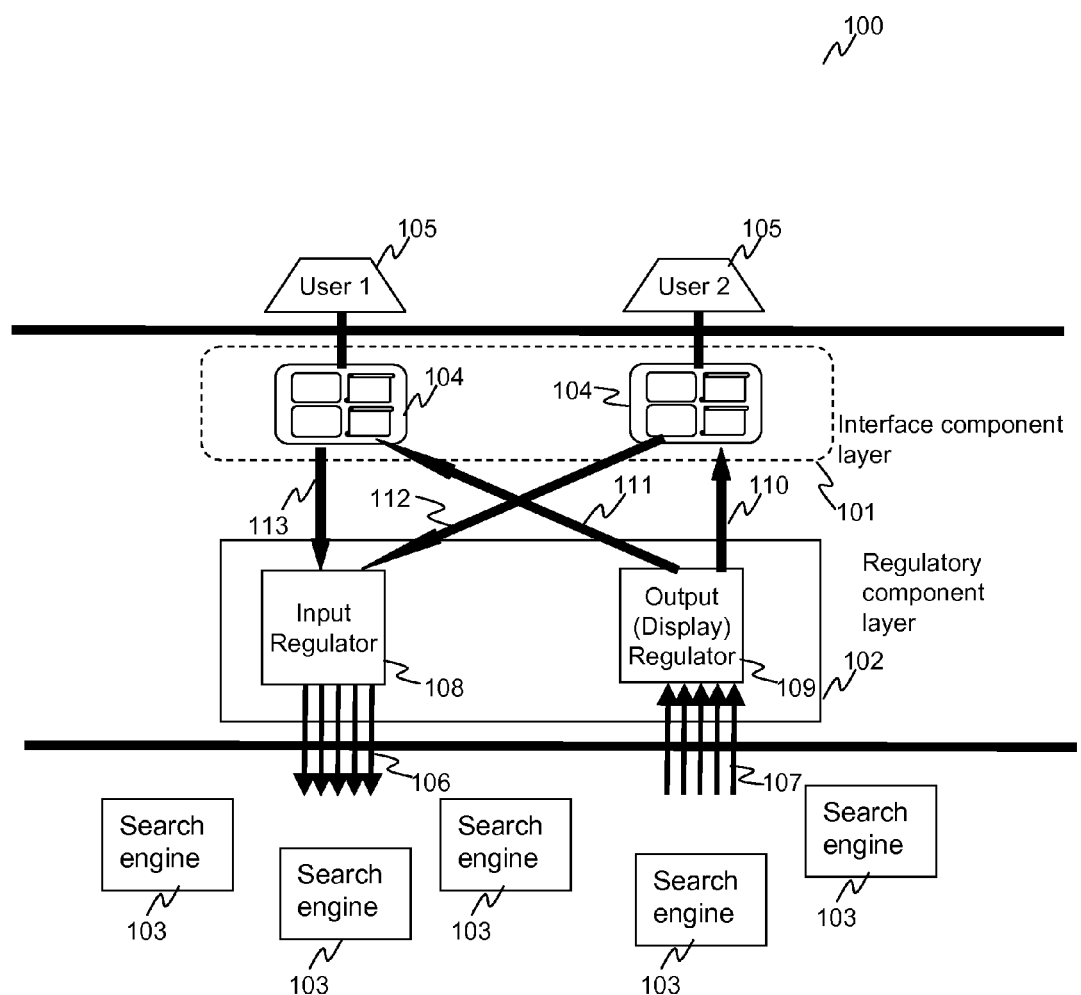
FIG. 1 illustrates an exemplary embodiment of an architecture of the inventive collaborative search system.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To obviate one or more of the above and other problems associated with conventional techniques for collaborative exploratory search, various embodiments of the inventive system include a set of components for collaborative, multi-user search interfaces, enabling rapid query iteration and collection exploration, along with a middleware layer for handling traffic to and from these interfaces. Embodiments of the inventive system allow a small group of focused information seekers to search through a collection of information in concert. These embodiments system provide exploratory feedback not only based on the individual's search behavior, but on the current, active search behavior of one's fellow search allies.

The aforesaid embodiment of the inventive methodology is based, at least in part, on the assumption that the users who have gotten together to search collaboratively have the same information need, but differing perspectives and insights as to how to best express the queries to meet that need. The inventive collaborative exploratory search system will therefore provide tools and algorithmic support to focus, enhance, and augment searcher activities. Searchers can, by interacting with each other through system-mediated information displays, help each other find all relevant information more efficiently and effectively.

In addition, in an embodiment of the inventive system, each searcher on a search team may fill a unique role, with interface and display components optimized for that role: query origination, results evaluation, and results partitioning are a few examples of types of roles that a search team might comprise. The inventive notion of the team patterns and role types will be discussed in more detail below.

In various exemplary embodiments of the inventive collaborative exploratory search system, a team of people with shared information need engage in exploratory search together. This search happens synchronously, leveraging real-time feedback in the search loop. The search team works together, finding patterns and information that each player individually might not have found, and doing so more efficiently than any single person could have. Each team member brings their own expertise and point of view to a shared search task. Distributing tasks and roles among team members leverages individual expertise and creates efficiencies of scale. Supporting the aforesaid different roles and tasks involves resolving complexities in control and display. Accordingly, an embodiment of the inventive system is provided with a inventive regulatory component, which is designed to perform this task.

An embodiment of the inventive collaborative search system may be implemented as a component-based control system involving the interface and middleware layers for collaborative exploratory search. The components may include modules for multi-user input and display capabilities, and are individually configurable to allow simultaneous manipulation of multiple search parameters and algorithms.

One embodiment of the inventive system is a component-based control system involving the interface and middleware layers for collaborative exploratory search. The components of various embodiments of the inventive system include modules for multi-user input and display capabilities, and are individually configurable to allow simultaneous manipulation of multiple search parameters and algorithms. Each input interface module of an embodiment of the inventive system may contain a number of controls, for different data dimensions or manipulations (e.g. weighting of terms, or filtering by metadata such as time, location, or author). Input modules may also incorporate a language interface such as a keyboard, or voice for speech-to-text.

An important aspect of the system is the display of the search processes and results. Each member of the team has a personal display area to work in, as well as the capability to view and contribute to a shared display space. The shared display space may contain interactive elements as well. The algorithmic engine to which the regulatory layer communicates may be specifically designed for collaborative search, or it may be a standard search engine run in a variety of configurations. Because the regulatory and interface component layers can operate with any search engine, the exact design of the search engine itself is not essential to the present invention and multiple suitable search engine can us utilized in conjunction with the inventive system.

Exemplary System Architecture

FIG. 1 illustrates an exemplary embodiment of the architecture of the inventive collaborative exploratory search system 100. As shown in FIG. 1, the embodiment of the inventive collaborative system operates as a collaborative search interface between multiple users 105 and one or more search engines 103, which provide the search result set 107. The embodiment of the system architecture 100 incorporates two distinct layers, which include interface component layer 101 and regulatory component layer 102.

The constituents of the above two component layers 101 and 102 will be described in detail below. Specifically, the interface component layer 101 incorporates two portions—a shared portion, used by the collaborative search system as a whole, as well as an individual portion intended for use by an individual searcher. The interface component layer 101 illustrated in FIG. 1 includes two interfaces components 104 for users 105. These interface components 104 are illustrated in more detail in FIG. 2.

Figure 2:
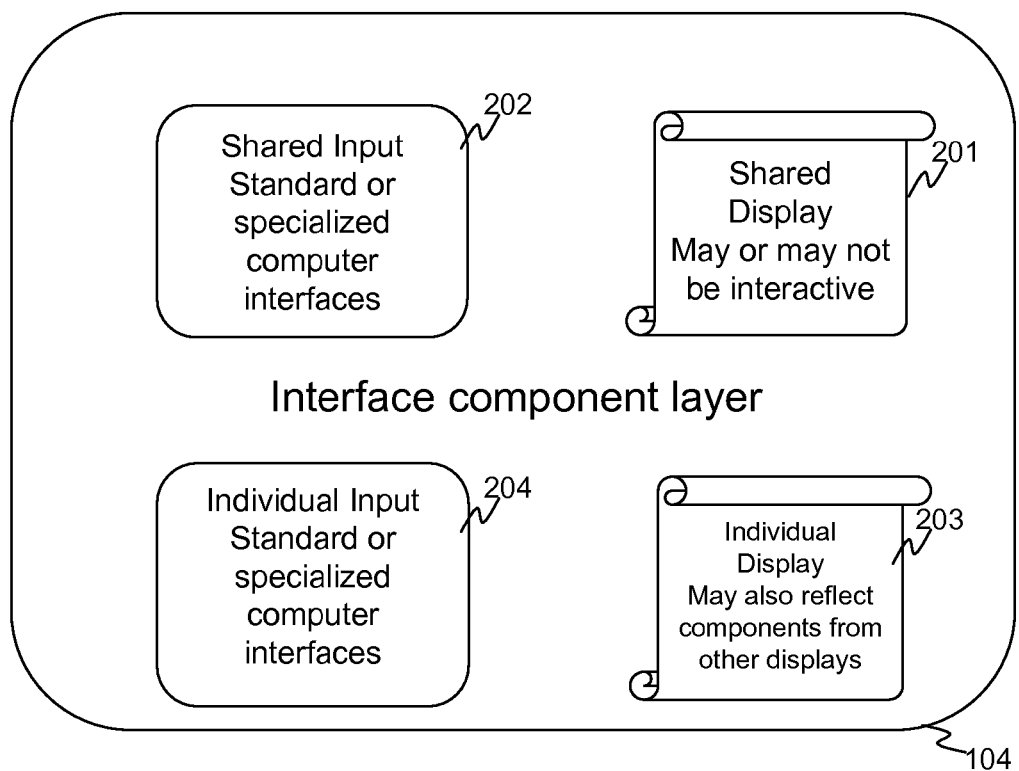
FIG. 2 illustrates an exemplary embodiment of an interface component layer.

The shared portion of the interface component layer incorporates a joint information display 201, as illustrated in FIG. 2. This information display 201 serves to summarize the collaborative information seeking activities of all users of the inventive collaborative search system. In addition, the interface component layer 101 includes an input mechanism 202 for manipulating information in the aforesaid joint information display 201. The individual portion of the interface component layer 101 includes, for each user of the inventive search system, an individual information display component 203, which is configured to show the results of the individual's interactions with the inventive system. Finally, the individual portion of the interface component layer 104 includes an individual input device 204, which enables each individual searcher to interact with the inventive search system.

Going back to the embodiment of the overall system architecture shown in FIG. 1, the regulatory component layer 102 is coupled with the interface component layer 101. This regulatory component layer 102 includes an input regulator 108 and an output regulator 109. The output regulator 109 incorporates a joint regulatory subsystem, responsible for coordinating and tying individual search activity together and an individual regulatory subsystem, charged with providing the search results 110 and 111 to individual users. These results are received by the output regulator 109 from one or more search engines 103 as search result sets 107.

It should be noted, however, that these individualized results, provided to the individual users by the individual regulatory subsystem, are not necessarily the same results one would have obtained by users while searching alone. The results provided to users by the inventive system may be informed and updated by the system based on the actions of other searchers in the group, as determined by the output regulator 109. These results are not limited to document results but include any result that the search engine returns, which may include but is not limited to documents, system-generated query term suggestions, weights on query terms, or categories or clusters of multiple documents.

The input regulator 108 is responsible for receiving individual user input 112 and 113, combining such input in an appropriate manner and using the combined information to form queries or other search requirements 106 issued to search engines 103.

As stated above, in another embodiment of the inventive system 100 may incorporate various interface components 104 for multiple users with a shared information need, for synchronously controlling, viewing, and interacting with multiple simultaneous streams of exploratory search data. In an embodiment of the inventive system, the interface layer 101 components 104 may include: one or more input components per user 204 (see FIG. 2); one or more output (information display) components per system (201 in FIG. 1); and zero or more hybrid (I/O) components per user (not shown).

In an embodiment of the inventive system, the interface component layer 101 performs, without imitation, the following tasks: receives input from two or more users; sends input to regulator layer; accepts output (results) from regulator layer; and displays output (results) in appropriate display components. Regulator components of an embodiment of the inventive collaborative search system ensure the overall coherence of the system, managing traffic to the interface layer above and the algorithmic engine below. It also keeps track of individual user identities associated with data streams.

In an embodiment of the inventive system, the regulatory layer components may include an input coordinator operable to: receive input streams 112 and 113 from interface layer; detect and resolve inconsistencies in input streams. Such inconsistencies may take place when two people assign different weights to a single term. The input coordinator 108 may be further configured to schedule and assign data delivery to a search engine. It should be understood that the specific implementation of the search engine is not critical to the present invention and that the inventive system may be used with any suitable web-based search engine or search engine or information repository of any other type.

The output coordinator 109 is configured to: receive results from a search engine; perform data transformation (e.g. scale management) and route appropriate data to correct display.

Various Embodiment of Inventive Search System

One specific embodiment of the inventive collaborative search system focuses on one particular system architecture: several users working in the same room at the same time. However, the inventive concept not limited to this particular embodiment. There are multiple other possible configurations in which the inventive multi-user control interfaces may be used. Thus, all such other configurations also fall within the scope of the inventive methodology.

It should be noted that the inventive search system is not limited to only two or three collaborative searchers. While in some applications the number of searchers may be small, it is entirely possible for four or more searchers to collaborate. It should also be understood that the number of searchers might influence the type of facilitation done by the system but the core notion of multivalent controllers operated by multiple users remains the same. The inventive system can be used live in-person (co-located) or via distributed co-presence (e.g. Web, Second Life or other virtual environment, teleconference).

The functions controlled by each of the described interface components may be split up into roles in various manners, as described below. In a first "equal" role scenario, each individual searcher is responsible for a complete, full subsystem, including searching, picking query terms, assessing relevance, and other similar tasks. In other words, all searchers using the inventive system have equal roles and responsibilities. In a second, "hierarchical" approach, one user serves as a human coordinator of the search system, having multiple mirrored functionally separate subsystems. Each subsystem has a human specialist optimized for that functional area. For example, one user could be responsible for picking new query terms, another user—for assessing document relevance, and yet another user—for arranging relevant documents into topical partitions. The aforesaid system-assisted human coordinator could ensure that the right information is flowing to the right people, or that there is not too much topic drift in the search as a whole. Finally, in a "partitioned" system organization, individual searchers are separated by function, as above, but with no controlling hierarchy.

According to an embodiment of the inventive concept, various searchers within the inventive system are assigned different roles. The roles of the individual searchers using the inventive system may include the following roles, which are provided by way of illustration only and not by way of limitation. It should be understood that the inventive concept is not limited to any specific set or roles and other additional or substitute roles may be used. Exemplary roles of search participants may depend on the stage of the searching process. Specifically, during an initial search setup, one or more users may be designated as an information need architect, who would define the scope and relevance for the search problem. Another role may be available for the session designer, who assigns roles and coordinates low-level activities or tasks of individual searchers.

During the search stage, one or more persons may be designated as search term (query) generators. Use of more than one person for this role may be preferable because it would create a richer set of search results.

In an embodiment of the inventive search system, one or more persons may be designated for metadata filtering of the search results returned by the search engines. The metadata information associated with the search results may include a location of the document, an author, a creation time, access permissions, identities of the persons who reviewed the searched information; title of the document, language of the document, content type or types of the document, document file format, embedded tag data such as the number of times a word appears in the document and/or any other tags or metadata available for the search results.

In an embodiment of the inventive collaborative search system, one or more persons may be designated as visualization managers, who are entrusted with managing shared user display 201. It should be noted that visualization manager(s) do not manage personal displays 203, which are managed by the output regulator 109. However, the visualization manager(s) can draw information from the personal displays 203 to the main screen 201, or filter out a particular stream of information, or show just one information stream on the shared display 201. As would be appreciated by those of skill in the art, the visualization managers may perform a number of other functions and the inventive concept is not limited to any specific functions of the visualization managers.

In various embodiments of the inventive collaborative search system, one or more persons may be designated as evaluator(s) and relevance manager(s), which are charged with evaluating the search results generated by other members of the search team and with determining the relevance of those results to the search topic.

It should be noted that depending on the role of the particular user, the interface 104 used by that user to interact with the inventive system may be specifically configured. For example, for visualization managers, appropriate controls for controlling the shared information display 201 may be provided. Likewise, for users fulfilling other roles, appropriate tools and controls may be also provided that would enable them to perform the designated function.

Thus, software/hardware components of various embodiments of the inventive system include tools for supporting activity of multiple search participants in different roles, modes, or parts of a search. Specifically, an embodiment of the inventive system may include information architect support tools that would operate to suggested refinements to information need and manage results of evaluation sessions. Session design tools would operate to assist searchers in search term generation and/or facilitate comparison of search terms of a user with search terms used by other searchers. In another embodiment, the system may automatically offer thesaurus-like services to expand the search query coverage.

In another embodiment, the inventive system may provide functionality for automatic query enrichment and refining, which may be operable to provide refinements to query statements based on information received from other human searchers in ensemble. Filtering tools may also be provided. The system may offer standard presents and suggest optimal roles and visualizations of the results. The tools for evaluation of the search results may include an RSVP for fast skimming of text or images, word/phrase density/proximity evaluation modules as well as metadata indicators. As would be appreciated by those of skill in the art, many other modules, tools and functions may be included into the multi-role collaborative search system according to the inventive concept. Thus, the inventive system is not limited to any specific search tools or functionality.

Figure 3:
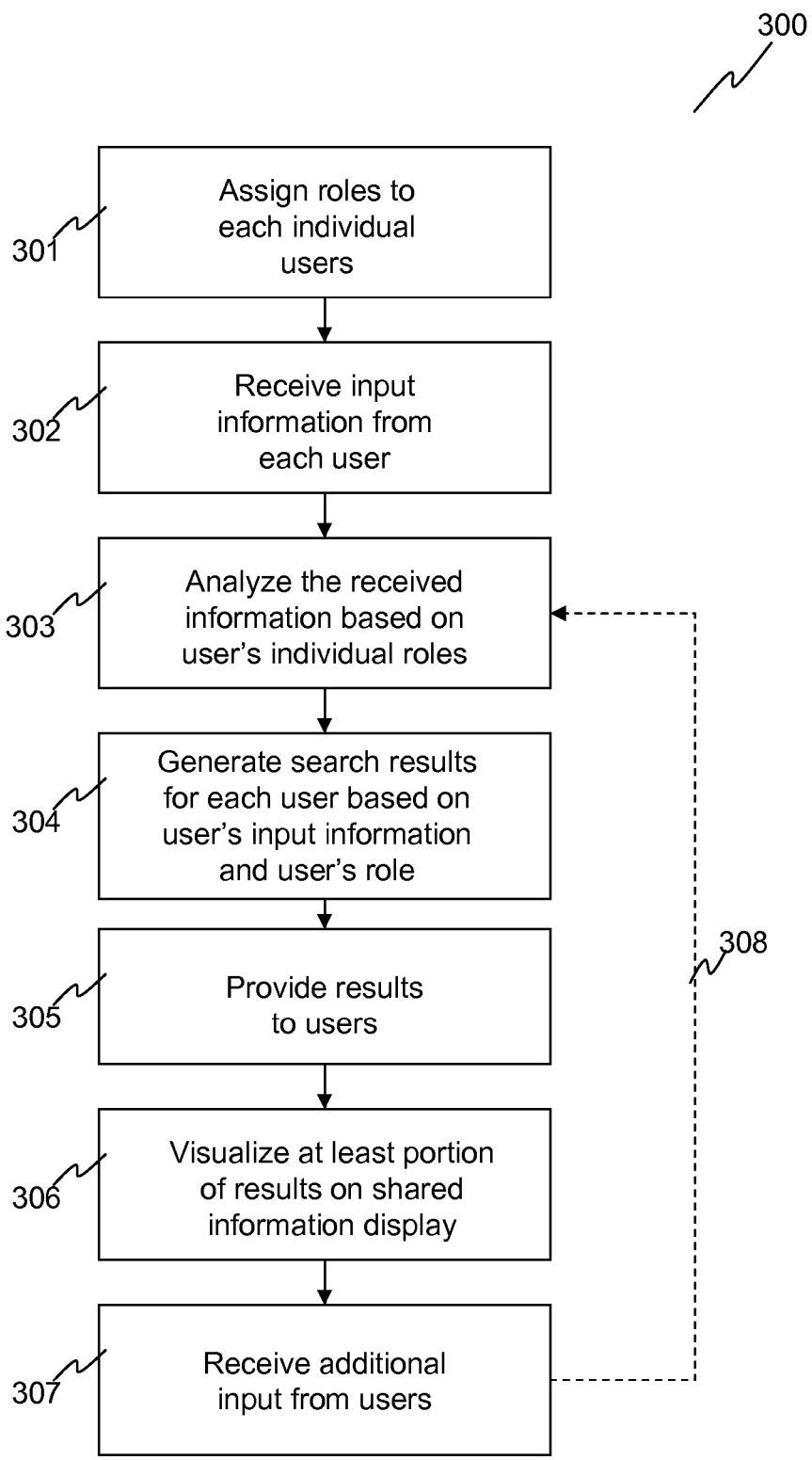
FIG. 3 illustrates an exemplary embodiment of an operating sequence of the inventive collaborative search system.

FIG. 3 illustrates a basic operating sequence 300 of one illustrative embodiment of the inventive collaborative search system. Specifically, operating sequence of an embodiment of the inventive search system may include one or more steps listed below. At step 301, each individual searcher is assigned a role. This role assignment determines the mode of the person's interaction with the system and dictates how the system will evaluate information originating from the specific user. At step 302, the system receives input information from each individual user. At step 303, an embodiment of the inventive collaborative search system analyses the information received from each individual user based on that user's assigned role in the overall search. In an embodiment of the inventive collaborative search system information received from different search participants may be treated entirely differently. Also at step 303, the received information is combined in input regulator 108 and search terms of queries are provided to one of the search engines 103.

At step 304, the system receives results 107 from the search engines 103 and, based on the received results and the individual roles of the users, prepares a subset of the results or other representation thereof for each individual searcher. This step may be performed by the output regulator 109. At step 305, these individual results are provided to the users using the individual display 203. At step 306, the output regulator 109 selects at least a portion of the results or other information for display to all users on the shared display 201. The operation continues to step 307, wherein additional input is received from the user based on the information displayed to the users in steps 305 and 306. After that, the next search process iteration 308 can be performed and new search results generated and displayed.

ILLUSTRATIVE EXAMPLES

There are a number of areas in which various embodiments of the inventive collaborative exploratory search system may become useful. It should be noted that the inventive system is not limited only to the described application scenarios. Rather, these scenarios are offered as illustrative examples.

Real Estate search. Those wanting to purchase real estate often have slightly different ideas about important factors. At the same time, it is almost never the case that any one property meets all the requirements or desired factors, such as location, price, upgrades, layout, and the like. Therefore, letting all the people who would be involved in purchasing a piece of real estate coordinate their searches though an embodiment of the inventive collaborative system would be invaluable.

Domain expert/domain expert. Two doctors from different domains need to collaborate on a complex diagnostic question, involving esoteric information from each domain. The inventive collaborative search tools they use allow unusual cross-correlations of databases and results from domain-specific journals, supporting the creation of a unique data map to aid in the diagnosis.

Domain expert/search expert collaboration. The collaborators are a domain expert (aerospace engineer) and a search expert (librarian). For example, an aerospace engineer (domain expert) really understands her own information need, i.e. the information being sought and why. But she has time constraints and also needs to be sure to cover as much or the applicable territory as possible; so she would like help in searching for that information. On the other hand, the librarian (search expert) really understands how to search, i.e. how to use the tools and what is good in various situations. But the librarian does not really understand the engineer's information need. This is a scenario for system-assisted role-based collaborative exploratory search, with tools leveraging each user's expertise.

Other uses of the inventive methodology include literature reviews (academic, medical, e.g.), legal and/or SOX-related issues (e.g.: Find all Enron documents pertaining to the setting up of phony subsidiaries), shopping-related web searches, gathering information on activities of competitors of a company, trying to understand a world event from multiple viewpoints, i.e. through multiple, varied news sources. In another application, an inventive system may be utilized for patent searching for Fortune 500 companies. A searcher, such as a patent agent, may use an embodiment of the inventive system to search issued patent(s) that may potentially cover some product the company is planning on developing or releasing.

In an educational application, a teacher could assign students in teams to collaborate on exploring ideas or learning about something in particular: "go find out about stars" or "see what you can discover about the ocean floor." The key here is to keep the assignment deliberately open-ended to encourage exploration down a number of pathways and to keep the experience engaging as well as educational for the students (leveraging the social interactions learned in collaborative gaming).

Evaluation

Inventors have performed a preliminary use study to determine the effectiveness of multiple points of view of different users in collecting query terms, and found increased effectiveness of the inventive system in locating relevant search results. Also, one version of this system aimed at collaborative exploratory search of video (for TrecVid) has already been implemented and used in performing a few design evaluation studies.

Exemplary Embodiment of Computer Platform

Figure 4:
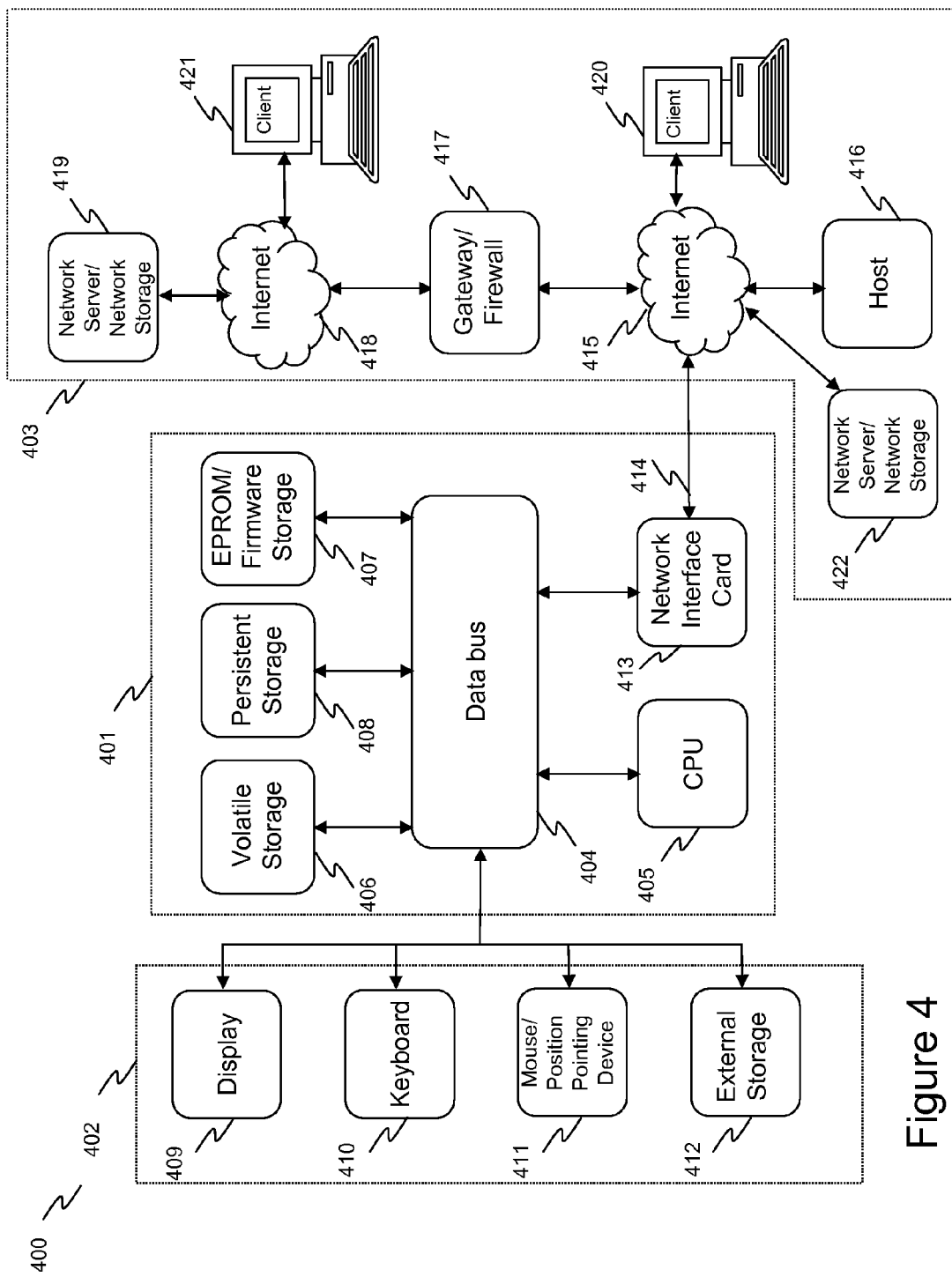
FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404. Transmission media can also take the form of acoustic or light waves, such as those generated during radio-wave and infra-red data communications.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other tangible medium from which a computer can read. Transitory computer readable media include carrier waves as described.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized collaborative search system. It is intended that the specification and examples be considered as exemplary only, with a true scope and spirit of the invention being indicated by the following claims.

What is claimed is:

1. A collaborative search system comprising:
   a. A first user interface component operable to receive first search information from a first user, wherein the first user is assigned a first role, the first role being associated with a task;
   b. A second user interface component operable to receive second search information from a second user, wherein the second user is assigned a second role, the second role being similar to or different from the first role, the second role being associated with a task;
   c. An input regulator component operable to receive first search information from at least the first user interface and the second search information from the second user interface; and aggregate the received search information based at least on the task associated with the first role and the task associated with the second role;
   d. A search engine interface operable to provide the aggregated search information search information to at least one search engine and to receive responsive search results; and
   e. An output regulator component operable to receive the search results from the search engine interface; route the search results based at least on the task associated with the first role and the task associated with the second role; and provide the routed search results to the first user interface and second user interface.

2. The collaborative search system of claim 1, wherein the first user interface component comprises an individual visualization display operable to provide to the first user individual routed search results.

3. The collaborative search system of claim 1, wherein the first user interface component comprises a shared visualization display operable to provide to the first user shared search information.

4. The collaborative search system of claim 3, wherein the first role of the first user comprises managing the shared visualization display.

5. The collaborative search system of claim 1, wherein the first role of the first user it to coordinate search activities of the second user and wherein the first user interface is specially configured for enable the first user to perform the coordination.

6. The collaborative search system of claim 1, wherein the first role of the first user comprises generating new query terms and wherein the second role of the second user comprises assessing relevance of found documents.

7. The collaborative search system of claim 1, further comprising a third user interface component operable to receive third search information from a third user, wherein the third user is assigned a third role comprising arranging relevant found documents into topical partitions.

8. The collaborative search system of claim 1, wherein the task associated with the first role of the first user comprises defining the scope and relevance for a search problem.

9. The collaborative search system of claim 1, wherein the first role of the first user comprises metadata filtering of the search results, the metadata comprising at least one of: a location of a document, an author of the document, a creation time of the document, access permissions of the document or identities of persons who reviewed the document.

10. A method comprising:
  a. Receiving first search information from a first user, wherein the first user is assigned a first role, the first role being associated with a task;
  b. Receiving second search information from a second user, wherein the second user is assigned a second role, the second role being similar to or different from the first role, the second role being associated with a task;
  c. Aggregating the first search information and the second search information based at least on the task associated with the first role and the task associated with the second role;
  d. Providing the aggregated search information to at least one search engine;
  e. Receiving responsive search results from the search engine;
  f. Routing the search results based at least on the task associated with the first role and the task associated with the second role; and
  g. Providing the routed search results to at least the first user and second user.

11. The method of claim 10, wherein the routed search results comprise individual search results and wherein the method further comprises providing the individual search results to at least the first or the second user.

12. The method of claim 10, wherein the routed search results comprise shared search results and wherein the method further comprises providing the shared search results to at least the first and the second user.

13. The method of claim 12, wherein the first role of the first user comprises managing the providing the shared search results to at least the first and the second user.

14. The method of claim 10, wherein the first role of the first user is to coordinate search activities of at least the second user.

15. The method of claim 10, wherein the first role of the first user comprises generating new query terms and wherein the second role of the second user comprises assessing relevance of found documents.

16. The method of claim 10, comprising receiving third search information from a third user, wherein the third user is assigned a third role comprising arranging relevant found documents into topical partitions.

17. The method of claim 10, wherein the task associated with the first role of the first user comprises defining the scope and relevance for a search problem.

18. The method of claim 10, wherein the first role of the first user comprises metadata filtering of the search results, the metadata comprising at least one of: a location of a document, an author of the document, a creation time of the document, access permissions of the document, identities of persons who reviewed the document, title of the document, language of the document, content type or types of the document, file format of the document, tag data embedded in the document; or a word count of the document.

19. The computer readable medium of claim 10, wherein the routed search results comprise individual search results and wherein the method further comprises providing the individual search results to the first or the second user.

20. A non-transitory computer readable medium embodying computer-readable instructions, which, when executed by one or more processors cause the one or more processors to perform a method comprising:
  a. Receiving first search information from a first user, wherein the first user is assigned a first role, the first role being associated with a task;
  b. Receiving second search information from a second user, wherein the second user is assigned a second role, which may be similar to or different from the first role, the second role being associated with a task;
  c. Aggregating the first search information and the second search information based at least on the task associated with the first role and the task associated with the second role;
  d. Providing the aggregated search information to at least one search engine;
  e. Receiving responsive search results from the search engine;
  f. Partitioning the search results based at least on the task associated with the first role and the task associated with the second role; and
  g. Providing the routed search results to at least the first user and second user.

* * * * *